3,457,348
STABLE SYRINGEABLE SUSPENSIONS OF PARENTERAL DRUGS IN COMPLEX FLOC FORM
Robert Arnold Nash, Spring Valley, and Bruce Edwin Haeger, Pomona, N.Y., assignors to American Cyanamid Company, Stamford, Conn., a corporation of Maine
No Drawing. Filed June 27, 1966, Ser. No. 560,850
Int. Cl. A61k 27/00, 9/00
U.S. Cl. 424—229                 10 Claims This invention relates to a new method for preparing physically stable pharmaceutical suspensions and to the new products thereby produced.

Physically stable pharmaceutical suspensions of drugs have, in general, been prepared with an electrolyte and various colloidal materials, such as clays, gums, and the like. Some of these suspensions show relatively poor physical stability, and for parenteral use some inorganic materials, such as clays, are undesirable. Also, particularly for parenteral use, problems are presented of syringeability, that is to say, ready flow of the suspension into a syringe and injection through the hypodermic needle attached thereto.

The present invention is based on the utilization of a chemical phenomenon occasionally encountered and considered as a serious drawback to produce stable pharmaceutical suspensions. It has been noted that preservatives, such as hydroxy compounds of the phenol and alcohol type, have destroyed stable suspensions in which solids have been maintained dispersed by means of surfactants, including nonionic surfactants. The flocculation resulting has been considered to be undesirable and for example, in the common suspension represented by calamine lotion, Dr. Marcus in an article in 1956 in vol. 79 of Drugs and Cosmetic Industries, page 456, stated with respect to the addition of phenol to an excellent calamine lotion dispersed with polyethylene glycol and polyethylene glycol monostearate as follows: "Upon the addition of phenol, however, there was an almost immediate flocculation of the suspension and a complete loss of desirable cosmetic properties."

The present invention is based on a surprising discovery that the interaction of hydroxy preservatives with nonionic surfactants, particularly those of the polyether type, can form fine dispersions which are, however, visually turbid. The disperse phase is probably liquid. In other words, the fine dispersion which is visually turbid is more likely to be an emulsion than to be a suspension. The present invention, however, is not intended to be limited to any particular theory of the exact state of the disperse phase formed by the interaction product of the preservative with the nononic surfactant. The visually turbid fine dispersion is capable of reacting or otherwise complexing with finely divided drug to form stable flocs which are large enough to be readily discernible in a visible light microscope and which thus incorporate the drug preservative surfactant complexes in the form of a suspension which is physically stable.

It has not definitely been proven whether there is any chemical reaction between the very finely dispersed reaction products of the preservative and nonionic surfactant and the finely divided drug. Accordingly, throughout the specification and claims the combination of the drug with the other materials which form the flocs will be referred to as a complexing operation, using this term in its broader sense as not necessarily limited to a chemical reaction. It is possible that the floc formation may be a purely physical complexing operating by physical actions, such as surface tension phenomena. The present invention is not concerned with the theoretical mechanism by which the stable flocs are formed. While the flocs are much larger than the very fine disperse phase of the interaction products of the preservative and nonionic surfactant, they are still quite small, and the resulting suspension is stable, keeps well, and does not settle out irreversibly. It constitutes an improved pharmaceutical product, and it is an advantage of the present invention that the product is not only stable but can readily be used for injection from hypodermic syringes without tending to clog the syringes. This property of syringeability is an important and valuable characteristic of the product produced by the present invention. Looking at the invention in another way, it may be considered that the invention operates by utilizing the phenomenon of flocculation, which had ruined certain good suspensions and emulsions of drugs in the past. Yet this action, which was considered undesirable, makes possible the improved product of the present invention.

In general, the amount of the hydroxy preservatives is considerably more than the amount of the nonionic surfactant, which is contrary to the usual situation where a preservative is used. It has been found that while combinations of nonionic surfactants and hydroxy preservatives which are capable of forming stable flocs with finely divided drugs fall in general ranges for particular surfactants and preservatives, the best proportions will vary somewhat with the drugs used and with their concentrations. Also, the preferred ranges are somewhat affected by other additions, such as for example polyhydric alcohols, such as glycols, sorbitol, and the like.

It is generally thought that the fine dispersion of the hydroxylated preservatives and the nonionic surfactant constitutes a weak bonding of the active hydrogen of the hydroxylated preservatives with some of the oxygen atoms in the polyether chain of the nonionic surfactants. This explanation is generally accepted, as experiments have indicated that such a weak hydrogen bonding actually can take place. The present invention is not intended to be limited to this theory, but because of extended experimental evidence, it is believed that the reaction mechanism is probably correct and is, therefore, advanced as a probable, reasonable explanation of this phase of the present invention. The complexing with the drug definitely takes place, because many of the characteristics of complexes, namely lack of sensitiveness to small concentrations of inorganic materials such as hard water, proceeds by mechanisms which have not as yet been determined, and therefore of course the invention is not limited thereto.

As has been pointed out above, it is not definitely known exactly how the very fine disperse phase of the visually turbid dispersion produced by interaction of preservative and nonionic surfactant acts to aggregate or flocculate the finely divided drug to form the final suspension of flocs. It seems probable that in some cases at least the mechanism may operate with purely physical forces, such as surface tension and the like. However, the flocs are so stable that it is quite conceivable that there may be chemical bonding also, and this is not excluded.

While any two nonionic surfactants and preservatives interact to form the visually turbid fine dispersion, under certain definite ranges of ratios, which though not extremely narrow are critical, the exact preferred ratio to be used with a particular drug will vary somewhat. The determination of the best ratio for any particular drug requires initially only routine testing of the visually turbid nonionic surfactant-hydroxylated preservative dispersion. Once the optimum has been established by the routine test it holds for the particular drug. It is, therefore, not possible to set preferred range limits in numerical form which would apply to all drugs.

It is an advantage of the present invention that the nonionic surfactants and preservatives to be used are not critical, although of course they must be pharmaceutically acceptable, and a wide range of readily available materials may be used: monooleates, monolaurates, monopalmitates, and monostearates of polyoxyethylene sorbitan, polyoxyethylene polyoxypropylene copolymers, alkylaryl polyether alcohols, polyoxyethylene stearates, and the like. The last three together with the polyoxyethylene sorbitan monooleate are particularly desirable and are preferred. In general, the molecular weight of the nonionic surfactants may involve from 5 to 40 ether blocks in the polymer, but is in no sense critical.

Among the common hydroxylated preservatives are phenol, the methyl, ethyl, propyl, butyl, hexyl and similar alkyl esters of parahydroxy benzoic acid, which are generically preferred to as parabens, benzyl alcohol, chlorobutanol, betanaphthal, resorcinol and the like. Other hydroxylated preservatives may be used so long as they have sufficiently active hydrogens, as do the ones illustrated, to produce hydrogen bonding with oxygens of ether building blocks in the polymer chain of the nonionic surfactants. It is, of course, possible to have more than one surfactant or more than one preservative. However, this is rarely attractive except where one or other may be normally commercially sold as mixtures. The possibility of mixed flocs is, therefore, only mentioned as being included in the broader aspects of the invention. The ranges of various combinations of typical surfactants with typical hydroxylated preservatives are shown in the following table:

CRITICAL RATIOS FOR STABLE FLOC FORMULATION

|  | Percent Wt. | Volume, percent |
|---|---|---|
| Polyoxyethylene sorbitan monooleate | 0.04 to 0.18 | Benzyl alcohol, 2.2 to 3.6. |
| Polyoxyethylene polyoxy-propylene copolymers | 0.01 to 0.05 | Benzyl alcohol, 3.2 to 4.0. |
| Alkyl-aryl polyether alcohols | 0.04 to 0.08 | Benzyl alcohol, 3.2 to 3.6. |
| Polyoxyethylene vegetable oil | 0.08 to 0.16 | Benzyl alcohol, 2.4 to 3.2. |
| Polyoxyethylene sorbitan monooleate | 0.06 to 0.15 | Phenol, 0.5 to 1.5. |
| Polyoxyethylene-polyoxypropylene copolymers | 0.03 to 0.11 | Phenol, 0.9 to 1.7 |
| Alkyl-aryl polyether alcohols | 0.03 to 0.13 | Phenol, 0.7 to 1.7 |

It will be noted that in general the preservatives should be used in amounts which are considerably larger than those customarily used merely for preservative effect. Thus, for example, phenol is ordinarily used in concentrations up to 0.5% w./v., but as a floc stabilizer it is used in concentrations from 0.5% to 2.0% w./v. Similarly, benzyl alcohol is effective as a preservative in ranges from 0.9% to 1.5% w./v., whereas for floc stabilization concentrations of 2.0% to 4.0% w./v. are used.

The invention will be described more particularly in conjunction with the following examples, in which the parts are by weight unless otherwise specified.

Example 1.—Preparation of stable suspension of 1,4-dimethyl-1,4-diphenyl-2-tetrazene (Simtrazene)

| Simtrazene concn., percent | Polyoxyethylene sorbitan monooleate, percent | Benzyl alcohol U.S.P., percent | Condition of suspension |
|---|---|---|---|
| 5.25 | 0.12 | 2.2 | Deflocculated. |
| 5.25 | 0.105 | 2.37 | Flocculated. |
| 10.5 | 0.105 | 2.37 | Deflocculated. |
| 10.5 | 0.07 | 2.8 | Flocculated. |

|  | Percent w./v. |
|---|---|
| Simtrazene micronized | 10.5 |
| Vehicle for suspension | 100.0 |

Vehicle for suspension:
Polyoxyethylene sorbitan monooleate _____ 0.07
Benzyl alcohol reagent _____ 2.8
Water for injection _____ 100.0

It will be seen that the Simtrazene requires fairly definite ratios which vary somewhat with its concentration. These were, of course, determined by routine stability tests. The procedure involved dissolving the polyoxyethylene sorbitan monooleate in about 25% of the water for injection. The benzyl alcohol was dissolved in about 50% of the water and this solution slowly added to the first solution with agitation and allowed to stand to achieve maximum turbidity. This usually requires about 30 minutes, but is not critical. Water is then added to the amount desired for injection and the Simtrazene powder is slurried with approximately 50% of the total vehicle to allow for complete wetting of the powder. The slurry is then homogenized and can be washed through with some additional vehicle, the suspension being brought up to final desired volume by further suspension vehicle.

The Simtrazene containing flocs are stable, keep indefinitely, are easily dispersed by shaking or gentle stirring, and can be injected hypodermically without problems. There is no serious sticking of the flocs to the barrel of the syringe of the hypodermic needle.

Example 2.—Preparation of a stable suspension of triamcinolone hexaacetonide (0.5%).

The formulation is as follows:

| Triamcinolone hexacetonide | 0.5% | 1.31 g. |
|---|---|---|
| Polyoxyethylene sorbitan monooleate | 0.11 | 0.275 g. |
| Phenol crystals | 0.7 | 1.75 g. |
| Carboxy methyl cellulose | 0.5 | 1.25 g. |
| Sodium citrate | 0.5 | 2.5 g. |
| Hydrochloric acid pH adjusted 7.0 | Q.s. | |
| Water for injection | | 250 ml. |

The polyoxyethylene sorbitan monooleate and the carboxy methyl cellulose are dissolved in approximately 125 ml. of the water for injection. The phenol is dissolved in 25 ml. of water for injection and then slowly added to the first solution and allowed to stand to achieve maximum turbidity, which usually takes about 30 minutes. The triamcinolone hexacetonide is slurried in the above mixture and passed through a colloid mill. The suspension is made up to 250 ml. with water to which had previously been added the sodium citrate adjusted to pH 7.0 with hydrochloric acid. The product was stable, kept well and had desirable properties for parenteral use.

Example 3.—Stable suspension of 21-deoxy triamcinolone acetonide (10%)

The formulation is as follows:

21-deoxy triamcinolone acetonide (micronized) _____ g__ 1050.0
Polyoxyethylene sorbitan monooleate _____ g__ 14.0
Phenol crystals _____ g__ 90.0
Water for injection _____ ml__ 10,000

The polyoxyethylene sorbitan monooleate is dissolved in approximately 5000 ml. of water. The phenol is dissolved in about 1000 ml. of water and slowly mixed with the first solution, which is then allowed to stand to achieve maximum turbidity, which takes about 30 minutes. The 21-deoxytriamcinolone acetonide is slurried in the above mixture and passed through a colloid mill. It is then made up to 10,000 ml. with additional water for injection. The product keeps well and has desirable properties for parenteral use.

Example 4

Finely divided sulfadiazine was formed into a suspension of flocs in two different concentrations, 1% and 10%. The formulation is as follows:

| Percent w./v. | Vehicle | | |
|---|---|---|---|
| 0.11 | Polyoxyethylene sorbitan monooleate | 0.33 | 0.33 |
| 3.0 | Polyethylene glycol mol. wt. 4,000 | 9.0 | 9.0 |
| 0.85 | Sodium chloride | 2.55 | 2.55 |
| 0.6 | Phenol | 1.8 | 1.8 |
| 100.0(v.) | Distilled water, q.s. ad | 300.0(v.) | 300.0(v.) |
| 1 and 10.0 | Sulfadiazine, micronized | 20.0 | 2.0 |
| | Vehicle (above) q.s. ad | 200.0(v.) | 200.0(v.) |

The glycol and nonionic surfactant are dissolved in 50% of the water, the phenol dissolved in 25% of the water and the phenol solution then added to the other solution and permitted to stand until visually turbid, which takes about 30 minutes. The sodium chloride is then added to complete the vehicle. The sulfadiazine is mixed with half of the vehicle, (100 ml.), homogenized and then washed through with the remaining half of the vehicle to make up a suspension of flocs of 200 ml.

The 10% sulfadiazine suspension on standing for two days rises in the form of a heavy thixotropic suspension with about 14 ml. clear at the bottom. The 1% suspension settles to a layer of about 14 ml. at the bottom, but is redispersed readily with a few shakes. The suspensions keep well and can be used for hypodermic injection.

The examples were carried out at room temperature. With the ratios of nonionic surfacant and preservatives visual turbidity with these ratios decreases as the temperature is lowered and in some cases actually disappears at 3–5° C. This phenomenon, however, is reversible and visual turbidity can once again be observed when the temperature is raised.

We claim:

1. A method of producing a stable syringeable hypodermically injectable suspension of a drug complex comprising in combination, reacting aqueous solutions of at least one nonionic surfactant of a polyether type and an aqueous solution of at least one hydroxylated, physiologically parenterally acceptable preservative having an active hydrogen capable of hydrogen bonding with the oxygen of the ether linkages in the nonionic surfactant, said preservative being selected from the group consisting of phenol, benzyl alcohol, alkyl esters of parahydroxy benzoic acid, chlorobutanol, betanapthol and resorcinol adjusting the concentrations and temperature to produce a visually turbid dispersion, the hydroxylated parenterally acceptable preservative being in higher concentration than normally required for preservative action but within parenterally acceptable concentrations, complexing finely divided solid parenterally useful drug with the turbid dispersion to form a suspension of stable flocs of the complexed drug and reaction product of the nonionic surface active agent and parenterally acceptable preservative, said suspension being adapted for hypodermic injection through the hypodermic needle of the syringe after being brought up to final desired volume by water for injection, and being without serious sticking of the flocs to the barrel of the syringe needle.

2. A process according to claim 1 in which the nonionic surfactant is a polyoxyethylene sorbitan monoester of a higher fatty acid and the preservative is selected from the group consisting of phenol and benzyl alcohol, the proportions being 0.06% to 0.15% w./v. and 0.5% to 0.15% in the case of phenol and in the case of benzyl alcohol 0.04% to 0.18% w./v. surfactant to 2.2% to 3.6% w./v. benzyl alcohol.

3. A process according to claim 1 in which the drug is finely divided sulfadiazine.

4. A process according to claim 1 in which the drug is 1,4-dimethyl-1,4-diphenyl-2-tetrazene.

5. A process according to claim 1 in which the drug is selected from the group consisting of triamcinolone hexacetonide and 21-deoxy triamcinolone acetonide.

6. A process according to claim 5 in which the drug is triamcinolone hexacetonide.

7. A stable suspension of a drug in complex floc form when prepared according to claim 1.

8. A stable suspension of sulfadiazine in complex floc form when prepared according to claim 3.

9. A stable suspension of 1,4-dimethyl-1,4-diphenyl-2-tetrazene in complex floc form when prepared according to claim 4.

10. A stable suspension of triamcinolone hexacetonide in complex floc form when prepared according to claim 6.

No references cited.

LEWIS GOTTS, Primary Examiner

S. K. ROSE, Assistant Examiner

U.S. Cl. X.R.

424—241, 244, 358